United States Patent
Pahl

(10) Patent No.: US 11,856,920 B1
(45) Date of Patent: Jan. 2, 2024

(54) FISHING TACKLE STORAGE APPARATUS AND METHOD OF USE

(71) Applicant: Gerald Edward Pahl, Cape Coral, FL (US)

(72) Inventor: Gerald Edward Pahl, Cape Coral, FL (US)

(73) Assignee: Gerald E. Pahl, New Holstein, WI (US)

(*) Notice: Subject to any disclaimer, the term of this patent is extended or adjusted under 35 U.S.C. 154(b) by 945 days.

(21) Appl. No.: 16/501,873

(22) Filed: Sep. 18, 2019

(51) Int. Cl.
*A01K 97/06* (2006.01)

(52) U.S. Cl.
CPC ................... *A01K 97/06* (2013.01)

(58) Field of Classification Search
CPC ...... A01K 87/009; A01K 97/00; A01K 97/06; A01K 97/16
USPC .............. 43/54.1, 57.1, 57.2; 224/920; 206/315.11
See application file for complete search history.

(56) References Cited

U.S. PATENT DOCUMENTS

| | | | | | |
|---|---|---|---|---|---|
| 742,040 | A | * | 10/1903 | Kurtz | A01K 97/06 206/315.11 |
| 2,525,057 | A | * | 10/1950 | Anderson | A01K 97/06 43/57.1 |
| 2,629,200 | A | * | 2/1953 | Woodhead | A01K 97/06 206/315.11 |
| 2,658,300 | A | * | 11/1953 | Snyder | A01K 97/06 43/57.2 |
| 2,667,010 | A | * | 1/1954 | Anderson | A01K 97/06 206/315.11 |
| 2,814,152 | A | * | 11/1957 | Trujillo | A01K 97/06 43/57.1 |
| 2,917,862 | A | * | 12/1959 | McCarthy | A01K 97/00 43/57.1 |
| 3,180,053 | A | * | 4/1965 | Norton | A01K 97/06 43/57.2 |
| 3,213,564 | A | * | 10/1965 | Borell | A01K 97/06 43/57.2 |
| 3,713,244 | A | * | 1/1973 | Alotta | A01K 97/06 312/73 |
| 4,866,875 | A | * | 9/1989 | Bliven | A01K 97/06 43/57.1 |
| 4,961,281 | A | * | 10/1990 | Listebarger, Jr. | A01K 97/06 43/57.2 |
| 4,977,700 | A | * | 12/1990 | Perlman | A01K 97/06 43/57.2 |
| D378,396 | S | * | 3/1997 | Sandberg | D22/134 |

(Continued)

*Primary Examiner* — Joshua E Rodden

(57) ABSTRACT

The present invention comprises a novel fishing tackle storage device and method formed by combining at least one connector and one collar, when operably assembled, efficiently supports and stores fishing tackle, and may be carried and positioned in a receptacle. In preferred embodiments, the various elements of the device, each configured, and when operably assembled form a fishing tackle storage device capable of both internal and external fishing tackle storage. The preferred embodiments of the aforementioned device includes the importance of apertures, caps, plugs, adhesives, methods of attachment, and their role in applications of internally and externally storing fishing tackle and its accessibility. Also included in these embodiments is the importance of the materials which make up their composition to accept and store fishing tackle effectively.

28 Claims, 8 Drawing Sheets

(56) References Cited

U.S. PATENT DOCUMENTS

| | | | | |
|---|---|---|---|---|
| 6,219,958 | B1* | 4/2001 | Eberts | A01K 97/06 43/57.2 |
| 8,813,416 | B2* | 8/2014 | Hudson | A01K 97/06 43/25.2 |
| 10,136,628 | B1* | 11/2018 | Canady | A01K 97/06 |
| 11,399,525 | B1* | 8/2022 | Volpe | A01K 97/06 |
| 2003/0217499 | A1* | 11/2003 | Cheek, Jr. | A01K 91/18 224/922 |
| 2004/0074136 | A1* | 4/2004 | Moss | A01K 97/06 43/57.1 |
| 2005/0155274 | A1* | 7/2005 | Chapel | A01K 97/06 43/57.1 |
| 2008/0134566 | A1* | 6/2008 | Greaves | A01K 97/06 43/57.1 |
| 2008/0244957 | A1* | 10/2008 | Rathsack | A01K 97/06 43/57.1 |
| 2013/0145678 | A1* | 6/2013 | Bosch | A01K 97/06 43/57.2 |
| 2018/0317472 | A1* | 11/2018 | Moffett | A01K 97/06 |

* cited by examiner

FISHING TACKLE STORAGE APPARATUS AND METHOD OF USE

BACKGROUND OF THE INVENTION

Fishing is increasing as a popular sporting activity. The increase in popularity is due to changes in demographics, affordability of boats and personal watercraft, and growing numbers of public fishing structures and beaches. Sport fishing requires tackle which needs some type of storage unit. Typically, equipment such as reels, lures, hooks, sinkers, and line are stored in tackle boxes which are clumsy, heavy, and usually difficult to use. In addition, tackle boxes house many sharp objects such as hooks and lures which can be dangerous to access. The invention (device and/or apparatus) is a smaller and lighter means of storage which is easy to transport and easy to organize. Most important, it is safer because it reduces the user's exposure to sharp objects such as hooks and lures.

BRIEF SUMMARY OF THE INVENTION

Generally, the invention is a storage device for fishing gear; however, specifically it is a device for storing items such as fish hooks, lures, fishing jigs, fishing flies, and leader systems. Used correctly, the device prevents kinking, snarling, and fraying, and unnecessary wear of hooked leaders, lures, and leader systems. There are two basic components of the device: a collar composed of Polyethylene plastic foam, and a handle composed of PVC plastic tube which is capped and/or plugged at either/or both ends. The device may be left unplugged and/or capped at either/or both ends, wherein acting as a conduit for leader systems to pass through the center of the handle for storage. The handle may also store fishing tackle internally as well. The collar may be configured with holes, channels, slits, and/or grooves which may accommodate tubes for the purposes of smaller fishing tackle storage. While the current prototype of the device is made up of Styrofoam, plastic, and PVC, future iterations of the invention may include different materials such as metals, wood, cork, carbon, paper products, and/or compositions thereof, as well as other materials developed and/or to be developed which may be used in the production of the device.

This apparatus may diminish accidents involving the fisherman from being impaled by fish hooks during normal tackle procurement while fishing. The hook portion of the above named fishing tackle is embedded into the plastic foam collar, cork collar, rubber collar or wood collar leaving the sharp hooked tips unexposed. The apparatus wherein, when capped at both ends, becomes buoyant to prevent loss of fishing tackle should it fall into the water. In smaller watercraft such as kayaks, canoes, paddle boats, and the like, the device provides safer use and ease of access while on the water in such an unstable water craft, because it can be stored in a rod holder freeing up valuable space, and readily accessible by its operator. It provides the same features in larger watercraft as well.

Some embodiments of the present invention are illustrated as an example and are not limited by the figures of the accompanying drawings; in which, like references, may indicate similar elements and in which, specific details are set forth for the purposes of understanding and explaining the present invention. It may be evident that the present invention may be practiced without these specific details by one skilled in the art.

Figure 1:
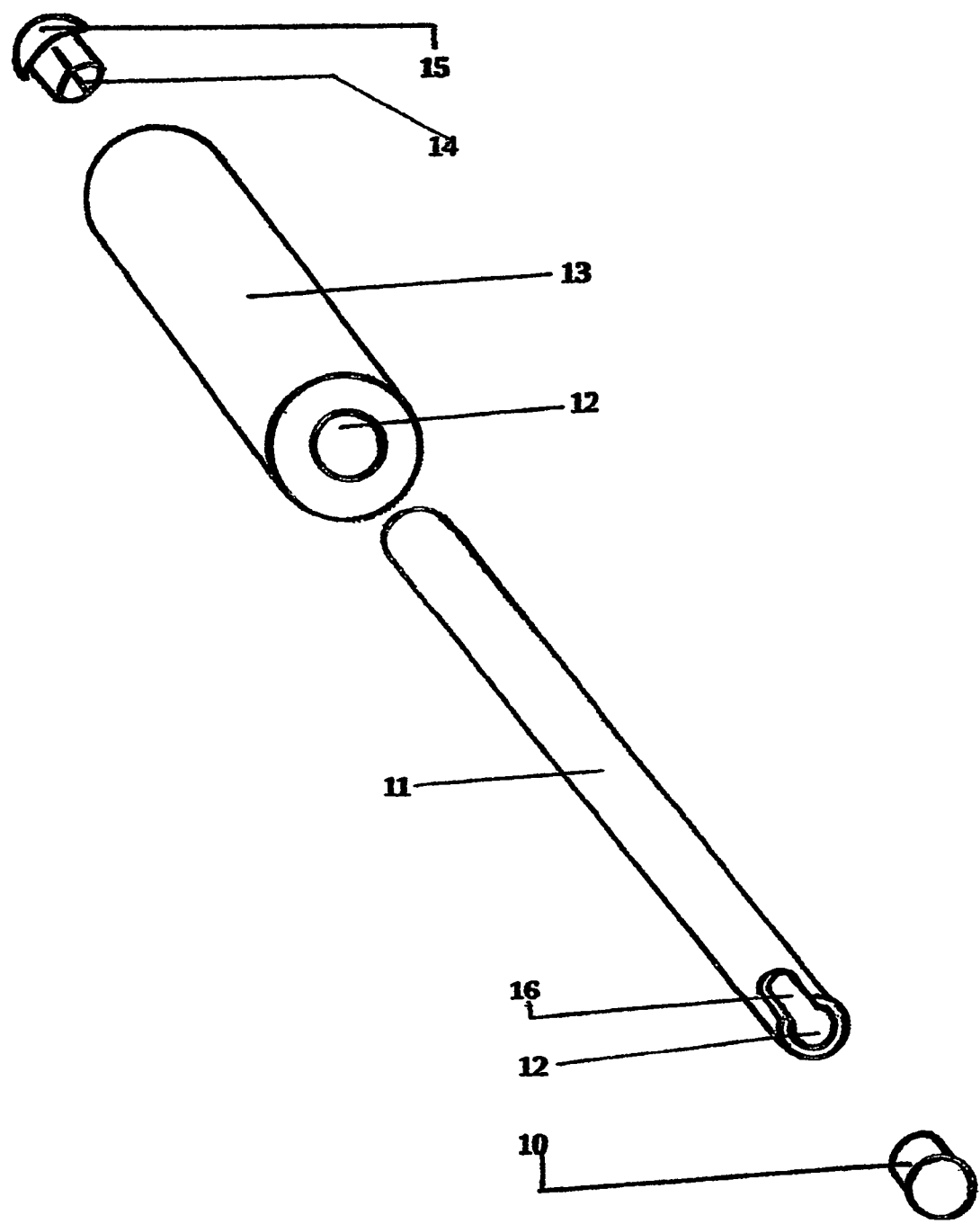
FIGS. 1-8 are illustrations of the apparatus, and the following discussions describe the basic elements and sample applications of the device, and are generally informative and do not describe or proscribe any limitations in terms of use, assembly, materials, or construction. For example, a figure may show one item of fishing tackle being used in one location of the device; however, that illustration is for discussion only and does not limit the user's application of many devices in multiple locations.

FIG. 1 depicts an exploded perspective view of the elements of the invention that may comprise a fishing tackle storage device known as the "device" and/or "apparatus" according to various embodiments of the present invention.

Figure 2:
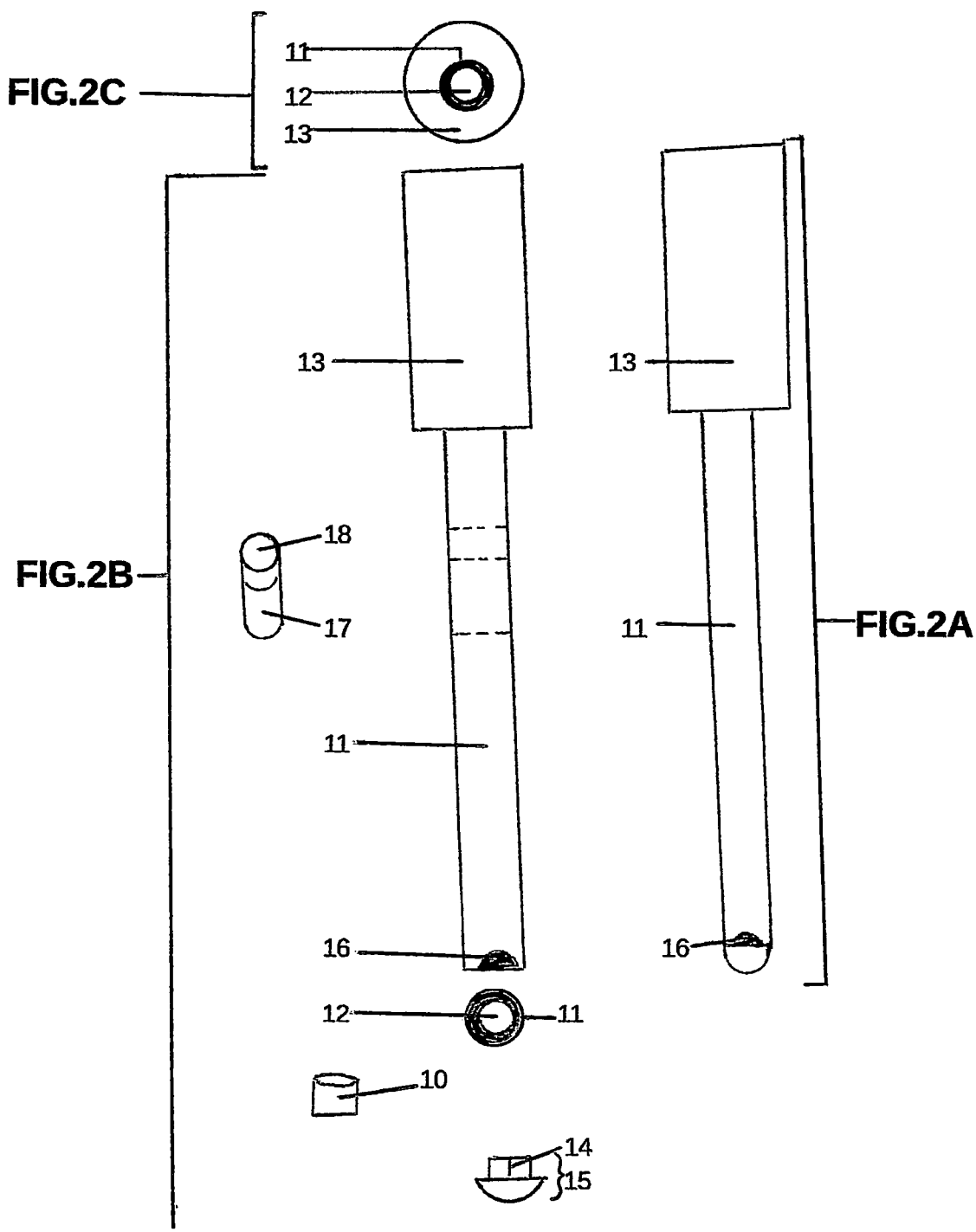

FIGS. 2A-2C depict a two-dimensional view of the fishing tackle storage device, illustrating a top and end view of the invention with illustrations of: foam collar, end caps, and/or dome caps, and plastic tube/s to be accepted by the aperture of the connector for the device.

Figure 3:
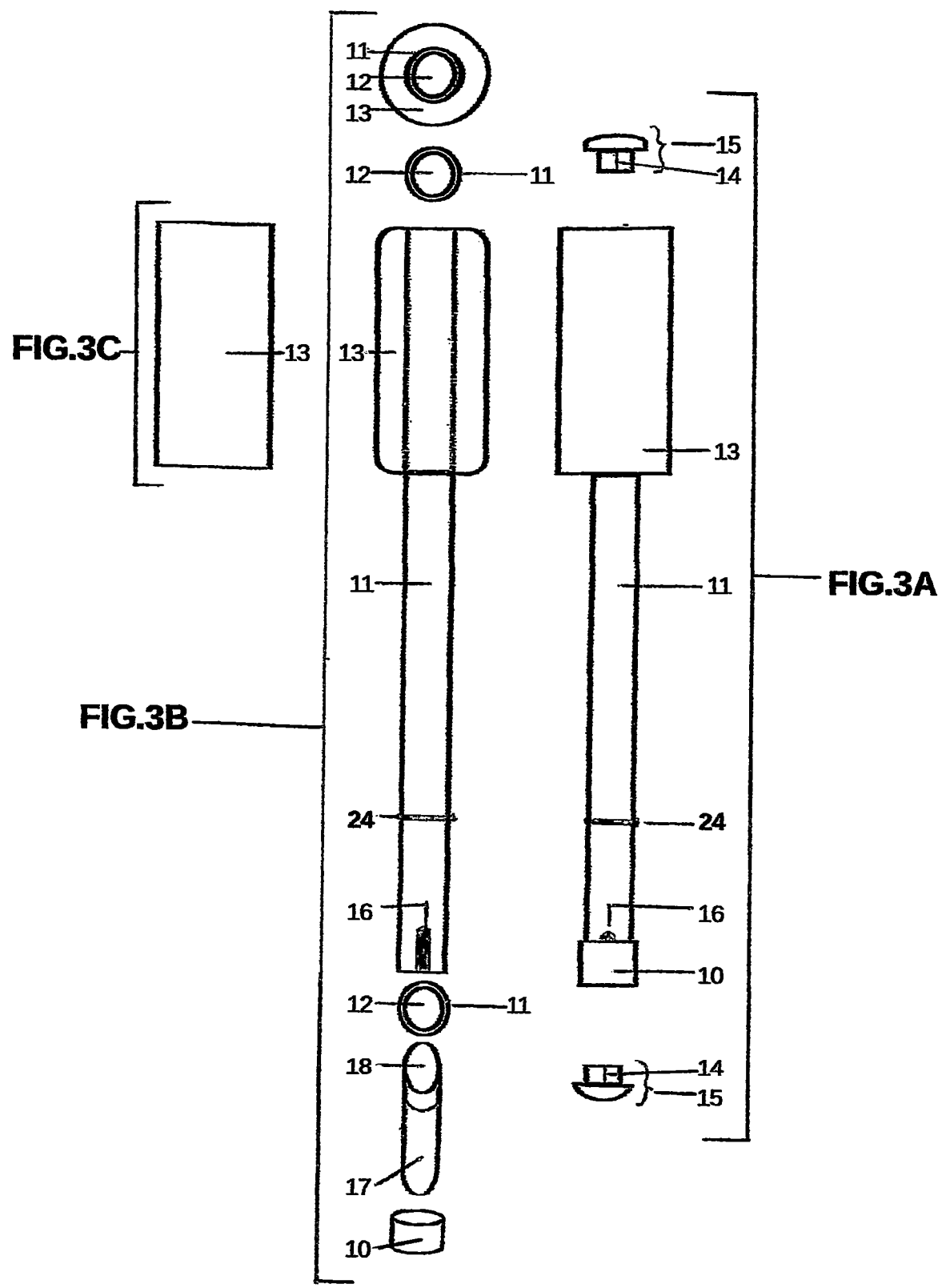

FIGS. 3A-3C depict a three-dimensional profile view of an assembled fishing tackle storage device with all elements (connector+collar+end caps and/or dome caps) connected to form the device of the present invention.

FIG. 4, FIG. 5, FIG. 6, and FIG. 7 depict an operably assembled fishing storage device with an example of how fishing tackle may be stored or embedded into the collar.

Figure 8:
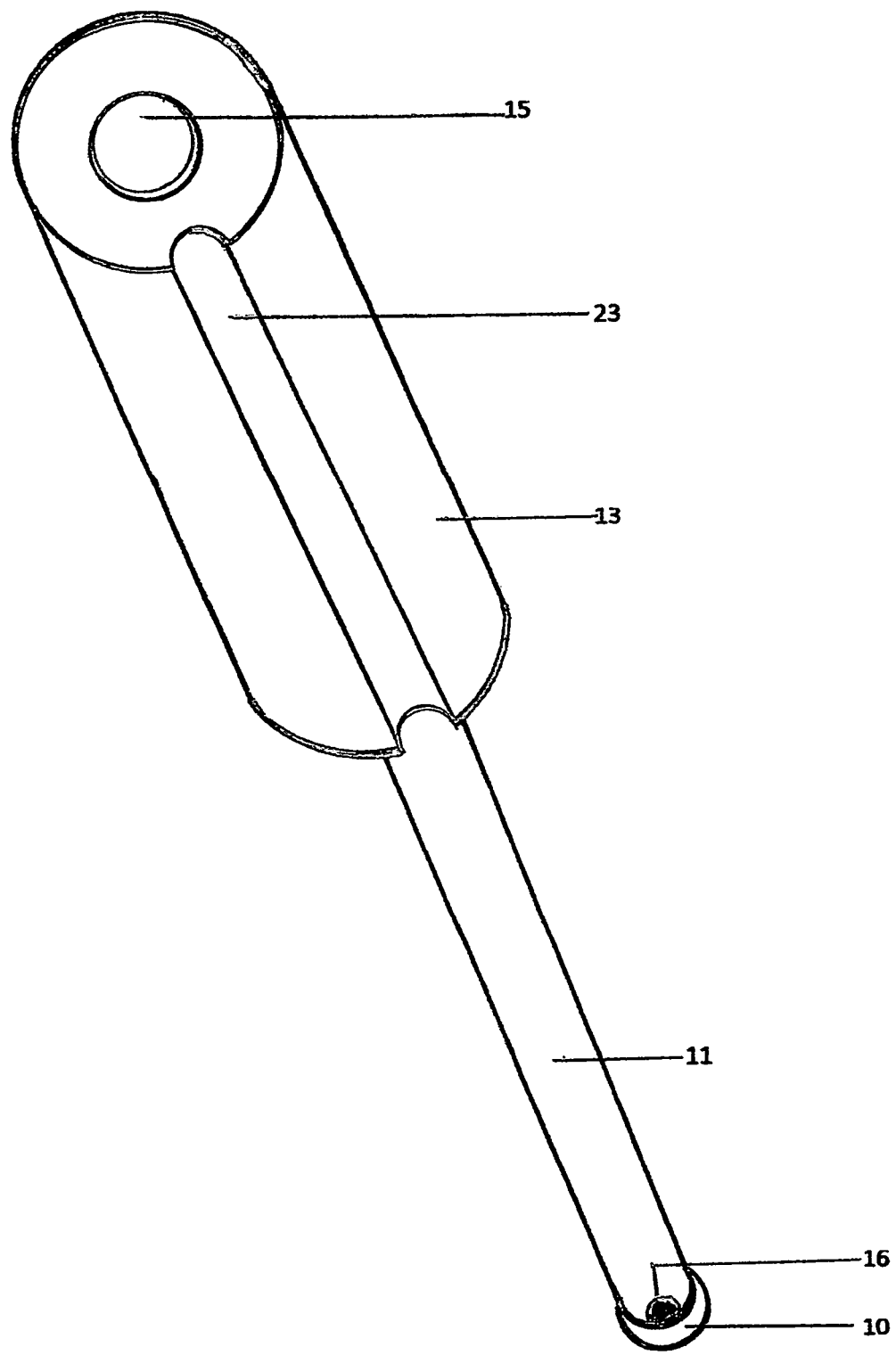

FIG. 8 depicts an illustration of an operably assembled fishing storage device with an example of grooved depressions and/or channels within the collar positioned parallel to the connector for the purpose of accepting multiple hooks and/or their devices.

DETAILED DESCRIPTION AND BEST MODE OF IMPLEMENTATION

Unless otherwise defined, all terms (including technical and scientific) used herein have the same meaning as commonly understood by one having ordinary skill in the art to which this invention belongs. It is further understood that terms and measurements, as those defined and commonly used in the dictionary, and or conventionally accepted, should be interpreted as having a meaning that is consistent with their meaning in the context of the relevant subject matter and the present disclosure, and will not be interpreted in an idealized or overly formal sense unless expressly so defined herein.

In describing the invention herein; it will be understood that a number of techniques, applications, and steps are disclosed. Each of these has individual benefit and each can also be used in conjunction with one or more, or in some cases all, of the other disclosed techniques, steps, and applications. The specification and claims should be read with the understanding that such combinations are entirely within the scope of the invention and the claims.

The terminology used herein is for the purpose of describing particular embodiments only and is not intended to be limiting of the invention. As used herein, the term "and/or," "any and/or all," "may/or may not," as well as other terms of the like, represent combinations of one or more of the associated listed items. As used herein, the singular forms "a," "an," "and," "the," are intended to include the plural forms as well as the singular forms, unless the context clearly indicates otherwise. It will be further understood the terms used: "comprises" and/or "comprising" when used herein, specify the stated features, steps, elements, and/or components, but do not preclude the presence or addition of one or more other features, steps, operations, elements, components, and/or systems of measurement, and/or groups thereof.

It is further understood that the terms, "connector," and "handle," are one in the same, used interchangeably within the context and embodiments of the varied references made within the invention. The connector referenced as thirty inches in length will include dimensions of length from six inches to ninety-six inches in length. Wherein the connector, the vial, the cap, and the plug comprising of: material made of one or more, or combinations thereof the following materials and/or substances to include but not limited to: silicone, Polyvinyl Chloride (PVC) plastic, vinyl, Polyethylene terephthalate glycol-modified (PET, PETE, PETP, PET-P) Ethylene Propylene Diene Monomer (EPOM), NBR rubber, SBR rubber, silicone, Neoprene, Nitrile, Hypalon, Viton, rubber, plastic, wood, high density polyethylene (HOPE), high density polypropylene (HOPP), and/or polystyrene (PS) as well as other known plastic resins and/or their combinations for purposes of the same.

It is further understood that the connector/handle referenced as thirty inches in length will include dimensions of length from six inches to ninety-six inches in length, and may/or may not include print or markings for a measuring device along the connector.

It is further understood that the diameter of the connector or handle referenced as three-quarter, and/or one-half inches as well as the other connector diameter sizes included within the embodiments of the present invention, wherein pipe diameter refers to the inside diameter, and reference to Schedule to Schedule 80 refers to pipe thickness with nominal pipe sizing is as referenced and stated in standard pipe schedules according to: American Standard Association, the American National Standards Institute, American Society of Mechanical Engineers, American Petroleum Institute, and National Industrial Supply. Included with the diameters of all material types which could or would make up the pipe connector as referenced within the embodiments of the present invention are these same referenced standards in pipe measurement. Furthermore, solid rod type material connectors would include outside diameters from ⅜ inches to 1½ inches.

It is further understood that when referencing the collar and/or sleeve, of the invention, they are one and the same element of the device of the invention; wherein being eight inches in length; it will include: dimensions of one inch in length to the full and complete length of the handle. Wherein the collar is comprised of four edges parallel to one another. The edges may be rounded in form. The hole in the center of the collar would be commensurate with the diameter, less and/or greater than that of the diameter of the connector or handle used according to the specifics and details of the invention.

It is further understood that the collar and/or sleeve operably attached to the handle of the present invention may and/or will be formed in appearance to have a smooth and/or irregular outer surface, and wherein the collar includes an effective form to include: channeled, gear-like, indented, grooved, slit and/or cuts, corrugated, spiraled, separation and/or spacing, undulating, and/or angered, collar in form/s to effectively attach fishing tackle.

It is further understood that the capped and or plugged ends of the invention's handle, wherein referenced as Polyvinyl Chloride (PVC) plastic plugs or caps, does not preclude the connector or plugs and/or caps to be limited to only PVC plastic, vinyl plastic, VynaFlex, wood, aluminum, metal, cork, vinyl (standard and/or Hi Temp), EPDM, PET, SBR, silicone, nitrile, NBR, Hypalon, viton, rubber, and combinations thereof, but is to include the presence and/or addition of one or more substances, natural or artificial, for purposes of the same application in the present invention.

It is further understood that the capped and/or plugged ends of the invention does not limit the invention to the named caps and plugs; wherein caps and/or plugs included in the embodiment include, but are not limited to the following types and materials: handle grips, threaded and/or unthreaded caps and/or plugs, PVC end caps, PVC dome caps, cloth cover, and/or plastic cover, cork, wood, metal, silicone, rubber, vinyl, and/or adhesive tape of all types and forms. Furthermore, caps and/or plugs are to include; but not limited to forms and types and/or formed of substances-including types: such as, handle grips, hanger, grab, anti-roll, vented, round, square, rectangular, short, long, flange, tapered, threaded and/or non-threaded, and tear caps and/or plugs, including that which was mentioned within the embodiments, and elements of the invention, and is not intended as a limiting factor of the invention. It is also understood that the cap edges may be standard (as accepted by the pipe; plumbing, and/or construction industry) and/or perpendicular to the connector; to include but not limited to beveled, rounded, and/or squared edges.

DETAILED SUMMARY OF THE INVENTION

The present invention relates to a new and novel fishing tackle storage device comprised of a connector with a collar operably attached to the connector at one end; wherein the connector consisting of PVC plastic pipe, wood pipe, or aluminum pipe, carbide pipe; or a solid rod in kind, includes capped, and/or plugged ends formed of but not limited to, PVC plastic, metal, cork, rubber, vinyl, polyvinyl, polyurethane, PET, or wood capped and/or plugged ends. Under certain circumstances the connector ends are left open, free of obstruction for purposes of becoming a conduit for hooked leader tackle of all lengths and sizes.

The connector (handle) has a cylindrical collar made of foam, cork, or wood attached to it at one end. The collar is attached to one end by sliding the handle through a hole (aperture) located in the center of the collar and secured; wherein fishing tackle such as lures, jigs, flies, hooks, and hooked leader systems are embedded into the collar for storage and easy access while fishing. The collar surface may be smooth and/or slit, and/or grooved, and/or fluted, and/or channeled, and/or geometric depression form, and/or elongated gear-like in form for the purpose of storing all fish hook styles and devices. Wherein the collar is capable of accepting tubular devices configured in the collar for storing fishing tackle as well. The handle being hollow (tubular) serves as an internal fishing tackle storage area: wherein fishing tackle may be stored either freely, or in tubes and/or vials, as well as other containers configured to be inserted within the aperture of the handle. While fishing, the handle is inserted into a holding device or a rod holder for ease of access while fishing. This allows for fishing tackle storage, display, access, and selection while fishing in any craft, fishing structure, beach, or surf.

All components may be in vibrant colors for quick location, identification, and retrieval. The colors include: red, orange, green, yellow, blue, pink, white, purple, bone, black, clear (transparent), and derivative colors thereof.

A second embodiment of the present invention provides a method comprised of a fishing tackle storage device in a rod holder, comprised of a connector (handle); a collar attached to one end of the connector; wherein the connector operably attached to the collar, is capped and/or plugged at both ends, or the connector ends are left open free of obstruction for purposes of a leader conduit, and effectively storing fishing tackle to be accessed by a person.

A third embodiment of the present invention provides a method comprised of a fishing tackle storage device, wherein the edges of the connector ends are flat (perpendicular to the length of the connector), rounded, and/or beveled to allow the connector to be passed through the center of the collar aperture effectively forming the device. Wherein the connector with the foam collar operably connected to the collar or sleeve includes a single continuous collar, and wherein the collar may or/may not be comprised of an effective number of discs, and/or spaces, and/or rings, and/or layers; and/or spheres, and effectively storing fishing tackle to be accessed by a person.

A fourth embodiment of the present invention provides a method comprised of a fishing tackle storage device, wherein the attachment of the collar, which is operably coupled to the connector with the aid of glue, and/or, washers, spacers, couplers, rings, pressure fittings, or pins; and effectively storing fishing tackle to be accessed by a person.

A fifth embodiment of the present invention provides a method comprised of a fishing tackle storage device, wherein the connector operably attached to the collar, wherein capped, and/or plugged ends of the connector may operably store fishing tackle in the handle by placing configured sized tubes within the handle; and effectively storing fishing tackle to be accessed by a person.

A sixth embodiment of the present invention provides a method, comprised of a fishing tackle storage device, wherein the connector operably attached to the collar, wherein may/or may not be placed in any type or form of receptacle; and effectively storing fishing tackle to be accessed by a person.

A seventh embodiment of the present invention provides a method comprised of a fishing tackle storage device, wherein the connector when operably attached to the collar, wherein a portion of the connector is buried in the sand on a beach or thereof, and effectively storing fishing tackle to be accessed by a person.

An eighth embodiment of the present invention provides a method comprised of a fishing tackle storage device, wherein the connector with the foam collar operably attached to the connector, wherein, at least one cap and/or plug connected to the connector opposite the collar containing end, wherein a hole or a slot on the same end of the connector is machined, cut, drilled, ground, milled, routed or slit into the connector to allow passage of leader or fishing line through the connector and out of the connector while being capped and/or plugged at least at one end of the connector. It is also understood that the cap/and/or plug may be configured with a hole formed in it to accommodate the same, and effectively storing fishing tackle to be accessed by a person.

A ninth embodiment of the present invention provides a method comprised of tackle storage device, wherein the connector with the foam collar operably connected to the connector, wherein, at least one cap and/or plug connected to the connector, wherein the connector is complete without opening/s to serve as a sealed pipe when capped and/or plugged, wherein enabling the apparatus to become buoyant, and effectively storing fishing tackle to be accessed by a person.

A tenth embodiment of the present invention provides a method comprised of a fishing tackle storage device, wherein the connector, and/or caps and/or plugs, may and/or may not be 22 threaded (screw thread and or machine thread as accepted by the standards across all industries by definition, and is not limited to these standards) internally and/or externally for purposes of attachment to one another when operably connected, and effectively storing fishing tackle to be accessed by a person.

DETAILED DESCRIPTION OF THE DRAWINGS

The present description is to be considered as an exemplification to the specific embodiments depicted and illustrated by the figures and their descriptions to follow. Referencing the FIGS.: 1, 2A, 2B, 2C, 3A, 3B, 3C, 4, 5, 6, 7, 8. The present invention will now be described by referencing the appended figures illustrating the preferred embodiments.

FIG. 1

FIG. 1 depicts an exploded view of the elements of the device that may comprise a fishing tackle storage device according to the embodiments of the invention. The connector (11) is passed through the aperture (12) of the collar (13) which is configured to accept the connector (11). The dome cap (15) is then accepted by the aperture (12) at the end of the connector (11) once the connector (11) is operably connected to the collar (13) and extends far enough to accept the dome cap (15) efficiently. The end cap (10) is then positioned over the end of the connector (11), but not to extend completely over the line gap (16) to allow certain leader systems to have an opening for proper storage and positioning on and in the device. The dome cap (15) is configured with a lateral aperture (14) for the purpose of a pressure/tension fitting when coming into contact with the interior surface of the pipe, and remain firmly held in place in an operable connection to the connector (11), and maintain the position in and against the connector unless operably removed by a person.

The connector referenced as thirty inches in length will include dimensions of length from six inches to ninety-six inches in length. Wherein the connector (11), the cap (10), and the plug (15) comprising of: material made of one or more, or combinations thereof the following materials and/or substances to include but not limited to: silicone, Polyvinyl Chloride (PVC) plastic, PET, Ethylene Propylene Diene Monomer (EPDM), NBR rubber, SBR rubber, silicone, vinyl, Neoprene, Nitrile, Hypalon, Viton, rubber, plastic, wood, high density polyethylene (HDPE), high density polypropylene (HOPP), and/or polystyrene (PS). For future reference, to reduce lengthy explanations of these substances, their acronyms will be used whenever possible.

The connector (11) may be in the form of a pipe (including square, cylindrical, octagonal, hexagonal, or any or combination of other geometric formed tube) or rod. It is further understood that the diameter of the connector (11) may be a portion of PVC pipe from 0.25 inches in diameter to 1.5 inches in diameter, however, is referenced as three-quarter inches in diameter (for the purposes of the invention) refers to the inside diameter, the handle assembly material is PVC Schedules to include Schedule 5 to Schedule 80 (pipe thickness), wherein the inside pipe diameter would be ⅜ inches to 1½ inches (one and one-half inches) in diameter, and the thickness of the pipe resulting in outside diameters as prescribed in said Schedules in the identification of said pipe as discussed above. Thicknesses may range from 1/16 of an inch to ¼ of an inch in thickness, and referenced as Schedule 5 to Schedule 80 pipe diameters as referenced and stated in standard pipe schedules according to the American National Standards Institute, American Society of Mechanical Engineers, and American Petroleum Institute, and National Industrial Supply. Wherein solid rod diameters would equal the minimum and maximum diameters of the same referenced pipe diameters, but do not preclude the presence or addition of increased or decreased diameters thereof. Configured elements may/or may not be threaded operably to become connected to one another, wherein the connector (11), and/or caps (10) and/or plugs (15), may and/or may not be threaded (screw thread and or machine thread as accepted by the standards across all industries by definition, and is not limited to these standards or thread types) internally and/or externally with threads (as defined by "Unified Thread Standards as indicated by American Society Of Mechanical Engineers and The American National Standards Institute). Wherein the collar (13) and/or connector (11) are threaded to operably connect to one another. Wherein the previously mentioned collar (13) may also be operably attached by means of a raised element and/or notch either on the connector (11) or located on the inside opening on the collar (13), with a corresponding slot on the opposite element of the device to accommodate the other element of the device with a sliding and/or twisting motion to operably lock the collar (13) to the connector (11) for purposes of attachment to one another, and/or glued, when operably connected, and effectively storing fishing tackle to be accessed by a person. When connected, by whatever means, the portion of the connector (11) extending from the collar (13) will become the handle (11) to which the caps and/or plugs are attached and/or left unattached for effectively storing fishing tackle by a person. The end of the connector (11) opposite the collar (13) is and/or may be cut, slit, drilled, grooved, routed and any other method to form a leader gap opening (16) for single and/or multiple fishing leader/s to pass through for storage.

The ends of the connector (11) may be left uncut in method/s as aforementioned as well resulting in apertures present at both ends of the connector (11). Methods of attachment for operably connecting the collar (13) to the connector (11) may include, but are not limited to glue, contact cement as well as other known adhesives, caulk and silicone sealers, tape (of all known types), threading of both elements, notching (as explained above), use of undersized collar (13) aperture (12), machine nuts, spacers, washers, couplers, rings and/or combinations thereof.

The handle (11) may serve as a storage compartment for smaller fishing tackle such as loose fishing tackle, or compartmentalized segments, wherein the connector/handle (11) is divided into individual separately sealed, capped and/or plugged segments, wherein the handle being of a form to include separate individually sealed compartments in any manner and/or segments, each holding fishing tackle.

Fishing tackle may also be placed in tubes/vials (17) and/or (18) of a size that will fit within the connector/handle (11). The tubes (17) and/or (18) may be made of but not limited to the following; glass, metal, plastic, vinyl, aluminum, and rubber, and other substances and/or their combinations as aforementioned in the embodiments of the invention. For purposes of fishing tackle and leader attachment to any part of the device, the attachment of such tackle may include but is not limited to the following forms of attachment; Velcro™, tape (to include all forms and types), rubber sleeve, rings and sleeves of all types, rubber bands, and adhesive sealer.

FIG. 2A/2B/2C

FIGS. 2A, 2B and 2C depict the device to include a top view and end view of the device. The purpose of FIGS. 2A, 2B and 2C illustrate the configuration of the invention from other views to provide a complete picture in the operable assembly of the device of the present invention. While preferred materials for the elements of the device of the present invention have been described, for simplicity, only the configuration and the components of the device will be explained in FIGS. 2A, 2B and 2C unless otherwise noted.

FIG. 2A depicts the elements comprising the present invention, while the configuration of these elements is necessary to illustrate its purpose and use, it does not limit minor variations to accommodate the final effective operability of the invention. A portion length (eight inches), but may include lengths of one inch to the full length of the connector (11) of the connector (11) is positioned into the aperture of the collar (13) to the complete length of the aperture of the collar, wherein the collar (13) is attached, effectively forming a device with a handle (11). Within the handle a leader gap (16) has been formed (as previously stated in the embodiments of FIG. 1) to provide passage of fishing leader from the opposite aperture of the connector (11), found on the same end as the collar (13), completely through the length of the handle (11), and emerging out of the leader gap (16), wherein the fishing leader is then effectively attached to the device. The aperture located on the newly formed handle (11) end is then fit with a dome cap, end cap, or other form of closure as mentioned in the embodiments of the present invention as described above, or the apertures may be left open free of obstruction for purposes of the same to operably form a fishing tackle storage device to be used by a person.

FIG. 2B depicts end views of the device illustrating the configuration if one were to be viewing from either end of the device. FIG. 2B further illustrates the incorporation in the configuration of the elements of the invention to include a tube (17) with a cap (18), this element is not limited to this specific type but may include other forms of capping and geometrically shaped in varied lengths such as: cylinder, torpedo, cigar-shaped, as well as others mentioned in embodiments of FIG. 1 to be filled with desired fishing tackle and placed inside of the handle (11) as represented and explained in FIG. 1. The dotted lines in the handle (11) of. FIG. 2B depict a possible placement of a single tube, wherein one or more tubes may be used and/or placed in the handle (11) of the present invention to be used by a person.

Also, FIGS. 2B and 2C illustrate the inclusion of the preferred method of capping and/or plugging the handle (11) ends using end cap (10) and/or dome cap (15), but does not limit the use of other elements to be used for the same purpose as described in the embodiments as described above; especially, a handle type grip similar to those found on bicycle handlebars, landing nets, brooms, most handle type grips for the purposes of the operational efficiency of the device, and the like. Again, the apertures at the end of the connector (11) of the device may be capped, and/or plugged, and/or left open free of obstruction.

FIG. 3A/3B/3C

FIGS. 3A, 3B and 3C depict the embodiments and configurations as described in FIGS. 2A, 2B and 2C and illustrates the following in FIG. 3A; dome caps (15) are shown ready to be positioned into the apertures (12) of the connector (11). As previously stated in the embodiments of the present invention the methods of capping and/or plugging are not limited to solely dome caps (15). Also, within this illustration is the presence of a fastener (24) shown in the form of an O ring attaching the leader line (22) to the connector (11) securely. The types and forms of fasteners as mentioned in the embodiments of the invention may or may not be included in the operational assembly of the invention. The location of the fastener (24) as shown is not the only possible position for it to be effectively used by a person.

FIG. 3B depicts the embodiments and configurations as described in FIGS. 2A, 2B and 2C with the inclusion of a tube and/or vial (17), capped (18), positioned in a method, but not limited to such method, to be inserted in the handle (11) of the device, followed by an end cap (10) to be placed over the end of the handle.

The collar (13) shown in FIG. 3C as shown in FIG. 3B has the outer edges rounded to illustrate another collar (13) edge variation acceptable to fishing tackle storage of the present invention. FIGS. 3A, 3B and 3C may include brilliant color combinations of the device for purposes of immediate identification and location during the use of the fishing tackle storage device by a person. Colors are to include but not limited to: red, yellow, green, blue, orange, pink, purple, bone, black and white or variations thereof. The blue shaded area of FIG. 3B represents the connector (11) having passed through the aperture of the collar (13), and being fastened to one another as previously mentioned in the embodiments of the present invention to be used by a person.

FIG. 4

Figure 4:
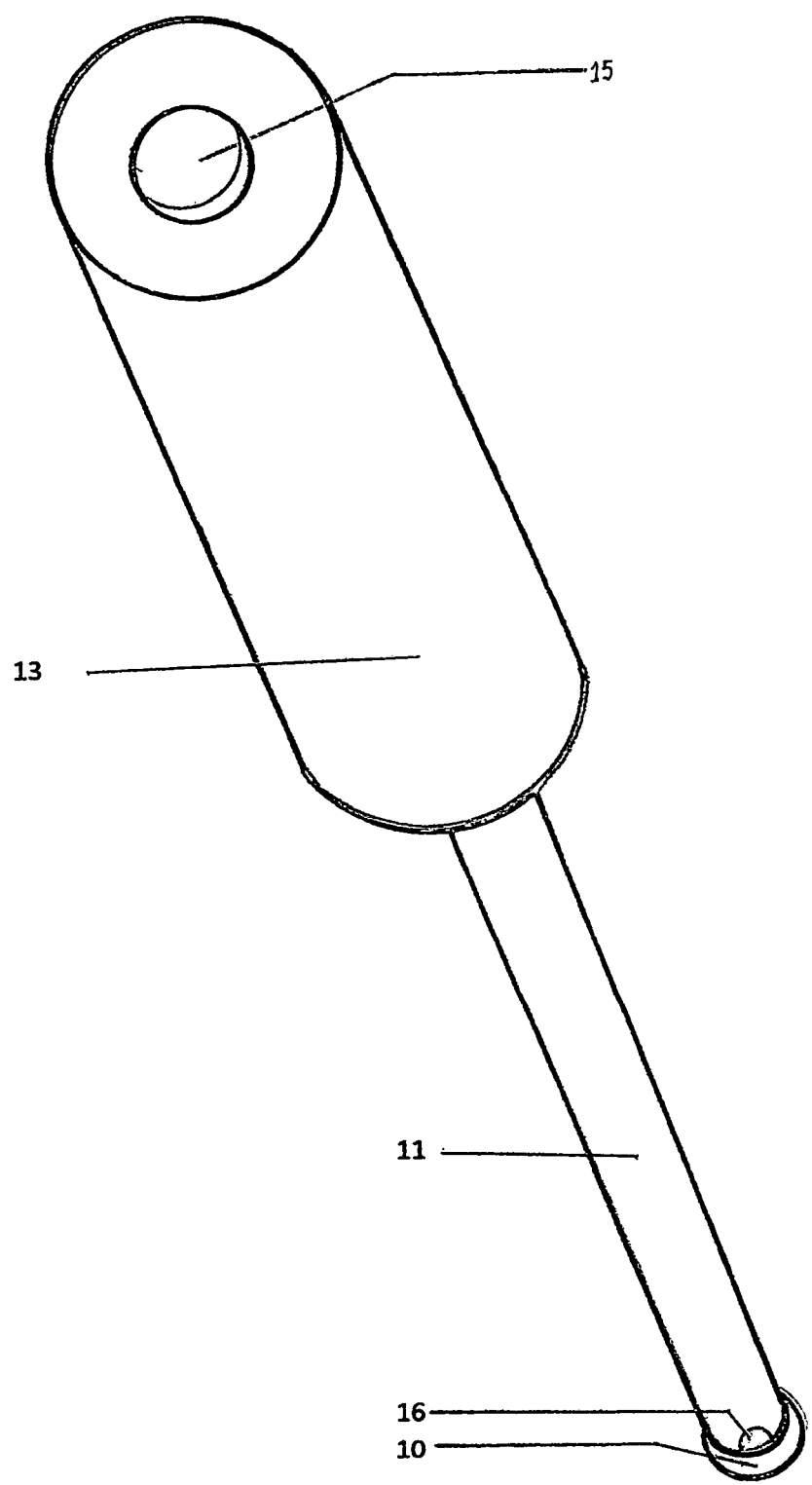

FIG. 4 depicts an operably assembled fishing tackle storage device. The elements are configured wherein the connector (11) is inserted through the aperture (12) and continue through the full length of the collar (13), wherein the collar (13) is attached to the connector (11), wherein the connector (11) is capped at the leader gap (16) end with an end cap (10), and the other end capped and/or plugged with a dome cap (15). The resulting apparatus is a handle (11) containing a plastic foam collar (13) capped (10) and/or plugged (15) at both ends, or left open the aperture being free of obstruction for purposes previously mentioned in the embodiments of the present invention. It is further understood that the elements and/or configurations mentioned in the embodiments of the device of the present invention may be considered in the operational assembly of the device, but is not limited by any, and may include other elements as well.

FIG. 5

Figure 5:
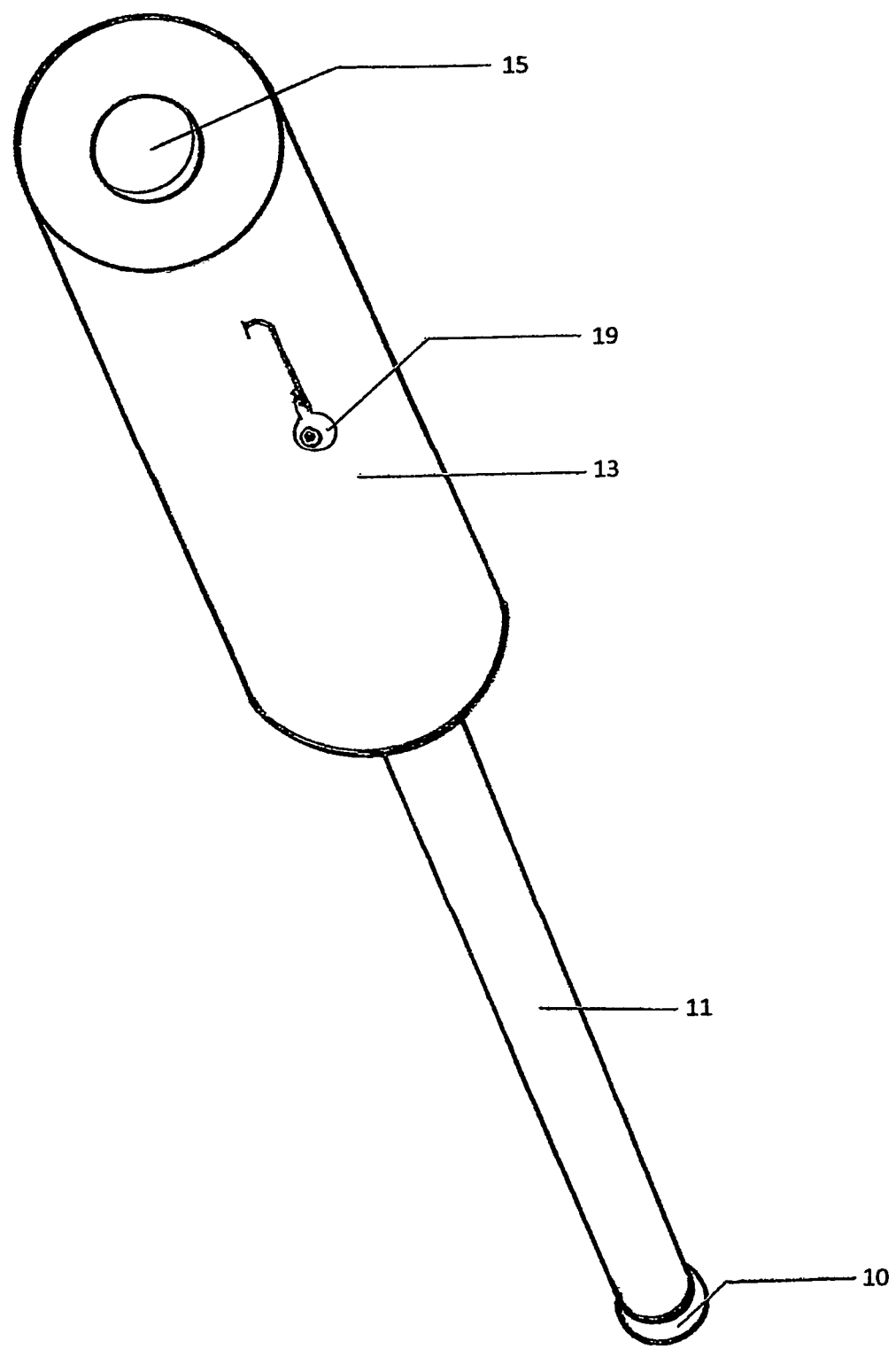

FIG. 5 depicts an operable assembly of the elements and their configuration of the present invention illustrating the connector (11) attached to the collar (13), and end capped (10) and/or dome capped (15) at the ends. The collar (13) is shown with a depiction of how fishing tackle (fishing jig) (19) might be embedded by the hooked end into the plastic collar (13). Fishing tackle to be embedded into the collar (13) may/or may not be embedded on any or all of the surface area of the collar (13). The leader gap (16) in FIG. 4 is intentionally missing in FIG. 5 to illustrate the element is not necessary for the device to be functional. Wherein a leader gap in FIG. 4 may/or may not be included in the configuration of the device in the present invention.

FIG. 6

Figure 6:
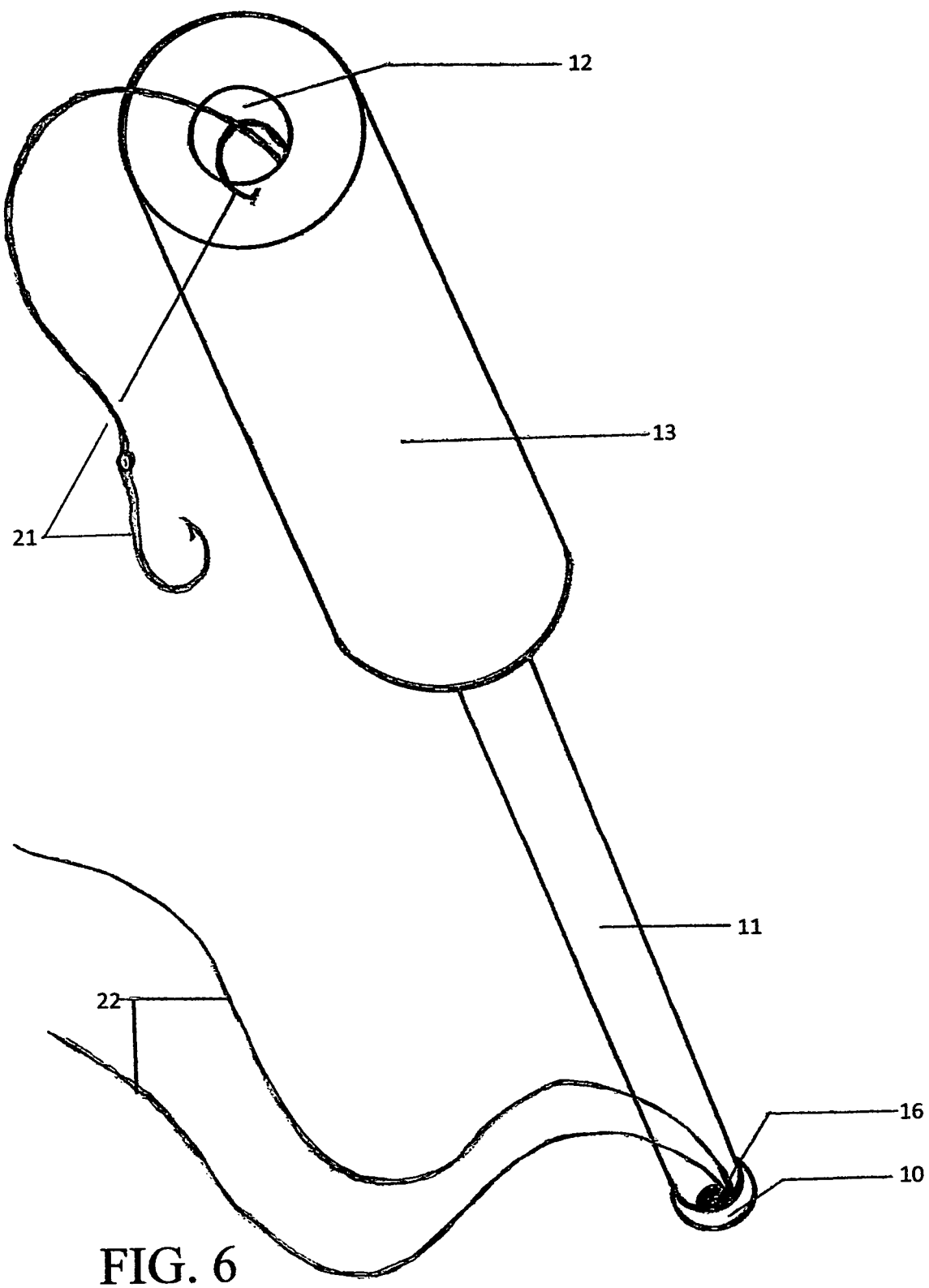

FIG. 6 depicts an operable assembly of the elements and their configuration of the present invention, illustrating the previously mentioned configurations of the embodiments of FIG. 4 and FIG. 5 with the inclusion of a hook (21) fit or combined with a leader (22), wherein the connector (11) acts as a conduit for the leader to pass through and emerge from the leader gap (16) at the opposite end, wherein the leader (22) is pulled until the hook (21) is stopped by the collared (13) edge of the connector (11). Thus, embedding the hook (21) into the collar (13), wherein the hook (21) will rest on the edge of the connector (11) with its point embedded into the collar (13). Wherein the fishing tackle storage device can be safely accessed by a person.

FIG. 7

Figure 7:
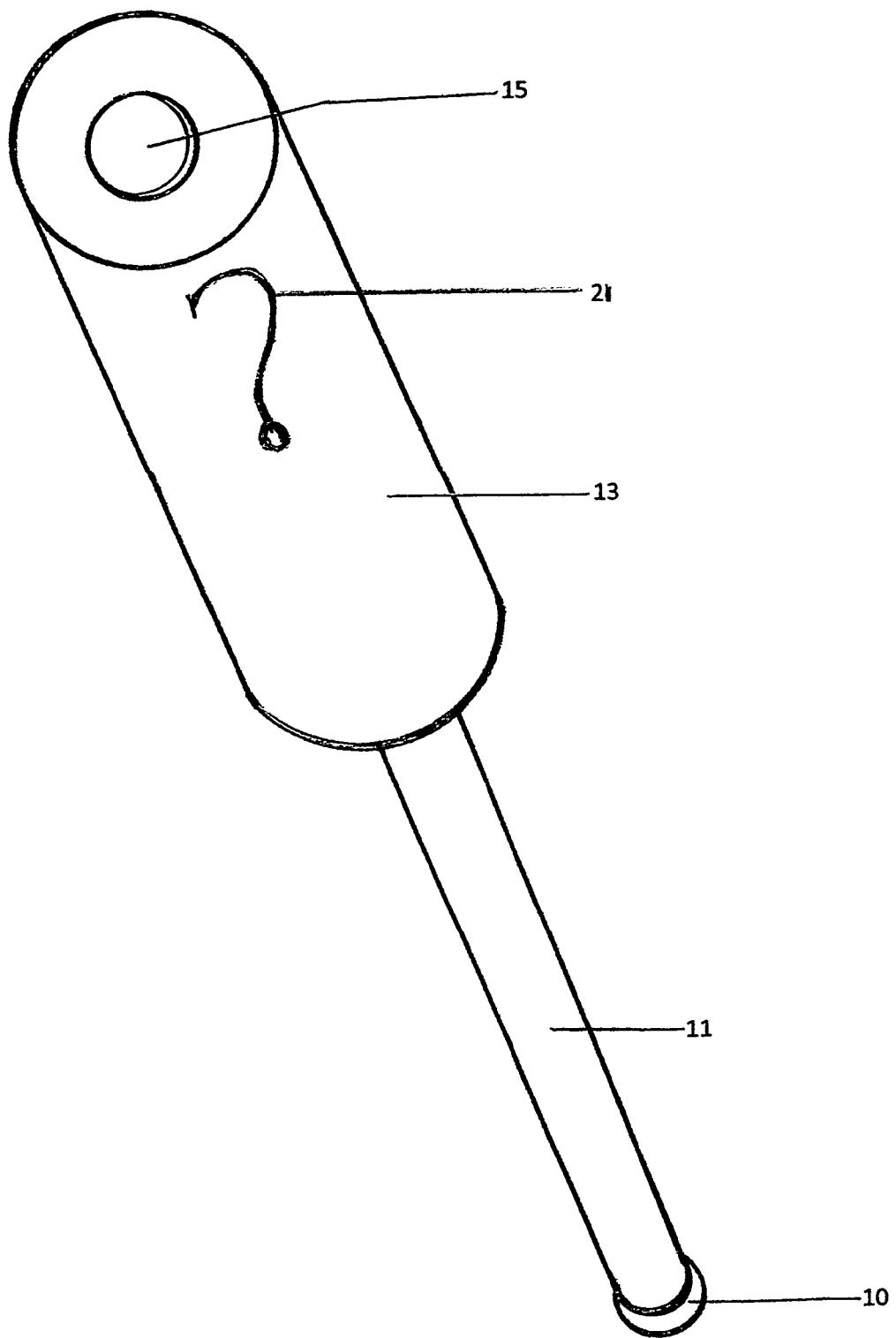

FIG. 7 depicts an example of an embodiment of a fishing tackle storage device in which a hook (20) is introduced into the collar (13) of the device of the present invention. In this example the hook (20) is embedded into the collar (13) of the device. In preferred embodiments the device may be reconfigured with one or more items of hooked fishing tackle embedded into the collar (13) systematically and/or randomly, and wherein non-hooked fishing tackle may/or may not be stored in the handle (11), wherein fishing tackle is to be stored either freely or in capped (18) tubes (17) as illustrated in FIGS. 2A, 2B and 2C and FIGS. 3A, 3B and 3C, and inserted into the handle (11) as illustrated in FIGS. 2A, 2B and 2C and capped (10) and/or plugged. Wherein the fishing tackle storage device may be accessed by a person.

FIG. 8

FIG. 8 depicts an example of an embodiment of a fishing tackle storage device in which a groove and/or channel (23) is configured into the surface of the collar (13), wherein is illustrated for the purpose of accepting fishing tackle. Wherein to include tubes (containing fishing tackle as mentioned within the embodiments) configured to be accepted by the grooves and/or channels (23), and/or but not limited to multiple hooked fishing tackle such as, treble hooks and treble hooked devices, wherein the groove (23) is configured in the full length of the collar (13), positioned longitudinally, along an axis parallel to the connector (11) of the fishing tackle storage device. The grooves (23) may include, and/or channels, and/or slits, and/or cuts, and/or gear-like depressions, following the same axis, as well as other geometric formed depressions, but are not limited to that which is shown in FIG. 8 or aforementioned embodiments of the invention.

Although only a single groove, or channel (23) is depicted, it is present for illustration and/or does not limit the number of grooves, channels, slits, cuts, and/or other geometric form of depressions and their possible combinations mentioned in the embodiments, wherein several grooves, channels, slits, cuts and/or their combinations, mentioned/or not in the embodiments may be included to be configured in the collar (13) of the invention to be accessed by a person.

Although the leader gap (16) (in previous illustrations) is not shown in some of the examples, this does not preclude its absence in the invention. Wherein as stated previously, it may be intentionally left out when circumstances warrant it as indicated in the embodiments of FIG. 5.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the scope and spirit of the present invention, are contemplated thereby, and are intended to be covered, and included by the following claims.

The invention claimed is:

1. A fishing tackle storage apparatus comprising:
   an elongated connector or handle configured to be gripped by a person and configured to be placed in a holding device, the connector or handle being tubular shaped of geometric form in the form of one of: square, hexagonal, octagonal, triangular, or cylindrical;
   a cylindrical collar assembly which is attached and/or adhered to one end of the connector or handle to provide support for the attached collar assembly, wherein the cylindrical collar assembly is operably coupled to the one end of the connector or handle by inserting the connector or handle through a center aperture of the collar assembly until the one end of the connector has passed through the collar assembly and is one of: flush with an end of the collar assembly, or extended to a point wherein the connector or handle protrudes beyond the end of the collar assembly;

at least one tube or vial which is configured to be placed inside of the connector or handle for holding and supporting fishing tackle;

wherein the connector or handle contains an exposed surface which is composed, and/or covered, either partially or completely, with materials to increase friction of the connector or handle for effective transport when gripped by a person, wherein one or both of the end and another end of the connector or handle are one of: capped and/or plugged, or left open, free of obstruction;

therein giving the apparatus a portion of the connector or handle configured to be gripped, and the apparatus having an enlarged cylinder formed by the cylindrical collar assembly at the end of the connector or handle to form the fishing tackle storage apparatus configured to be used by a person.

2. The fishing tackle storage apparatus of claim 1, wherein the connector or handle is made from a material which includes PVC (Polyvinyl Chloride) plastic.

3. The fishing tackle storage apparatus of claim 1, wherein the connector or handle is made from a material which includes aluminum and/or wood.

4. The fishing tackle storage apparatus of claim 1, wherein the connector or handle is made from a material which includes nylon or derivatives.

5. The fishing tackle storage apparatus of claim 1, wherein the connector or handle is made from a material which includes Polytetrafluoroethylene (PTFE).

6. The fishing tackle storage apparatus of claim 1, wherein the connector or handle is made from a material which includes Polyoxymethylene (POM).

7. The fishing tackle storage apparatus of claim 1, wherein the connector or handle is made from a material which includes Ultra High Molecular Weight polyethylene.

8. The fishing tackle storage apparatus of claim 1, wherein the cylindrical collar assembly is made from a material which includes plastic foam.

9. The fishing tackle storage apparatus of claim 1, wherein the cylindrical collar assembly is made from a material which includes polyethylene foam.

10. The fishing tackle storage apparatus of claim 1, wherein the cylindrical collar assembly is made from a material which includes polystyrene foam.

11. The fishing tackle storage apparatus of claim 1, wherein the cylindrical collar assembly is made from a material which includes higher molecular weight polyethylene to produce a foam surface which is penetrable, yet supportive of fishing tackle.

12. The fishing tackle storage apparatus of claim 1, wherein the cylindrical collar assembly is made from a material which includes wood or cork.

13. The fishing tackle storage apparatus of claim 1, wherein the cylindrical collar assembly is made from a material which includes inorganic and/or organic materials which are flexible yet rigid and/or dense enough, of a quality to support and hold fishing tackle.

14. The fishing tackle storage apparatus of claim 1, wherein the cylindrical collar assembly is made from a material which includes natural sponge or artificial sponge-like substances.

15. The fishing tackle storage apparatus of claim 1, wherein one or both of the end and the another end of the connector or handle is capped and/or plugged by at least one of: an end cap or a plug assembly, wherein the end cap or plug assembly is made from a material which is Polyethylene Chloride (PVC).

16. The fishing tackle storage apparatus of claim 1, wherein one or both of the end and the another end of the connector or handle is capped and/or plugged by at least one of: an end cap or a plug assembly, wherein the end cap or plug assembly is made from a material which is wood and/or cork.

17. The fishing tackle storage apparatus of claim 1, wherein one or both of the end and the another end of the connector or handle is capped and/or plugged by at least one of: an end cap or a plug assembly, wherein the end cap or plug assembly is made from a material which is Polyvinyl Chloride (PVC).

18. The fishing tackle storage apparatus of claim 1, wherein one or both of the end and the another end of the connector or handle is capped and/or plugged by at least one of: an end cap or a plug assembly, wherein the end cap or plug assembly is made from a material which is aluminum.

19. The fishing tackle storage apparatus of claim 1, wherein the collar assembly is configured to be moved to any position along the connector or handle, thereby exposing a portion length of the connector or handle at either the end and/or another end of the collar assembly.

20. The fishing tackle storage apparatus of claim 1, wherein the connector or handle is made from a material which is shown in PVC Schedules to include Schedule 5 to Schedule 80 pipe, resulting in an inside pipe diameter between ⅜ inches to 1½ inches in diameter, and an outside diameter range from 1/32 of an inch to ¼ of an inch.

21. The fishing tackle storage apparatus of claim 1, wherein the cylindrical collar assembly has at least four edges, wherein the four edges include inner and outer surfaces of the collar assembly, the inner surface of the collar assembly connected to the connector or handle, and end collar surfaces being at right angles to the inner and outer surfaces, wherein the edges are at least one of: rounded to appear to have no defined edge making the collar assembly to appear to contain one complete continuous surface, and the collar assembly configured with apertures in forms of channels, and/or grooves, and/or cuts, and/or slits, extending a portion and/or full length of the collar assembly for the purpose of accepting fishing tackle; and a thickness of the collar assembly is one-fourth of one inch to ten inches in diameter.

22. A method of using the fishing storage apparatus of claim 1 by a person, comprising: gripping the connector or handle, and positioning the apparatus in a holding device, then adding fishing tackle by embedding hooked fishing tackle into the collar assembly and filling the connector or handle and/or the at least one tube or vial with additional fishing tackle, and wherein the connector or handle and/or collar assembly is transported into a boat or another place by gripping the connector or handle, holding it upright, and moving or carrying the apparatus to a desired position in the boat, or the another place, and placing the apparatus in a receptacle for access by the person while fishing.

23. The method of claim 22, wherein the collar assembly is attached to the connector or handle and secured with glue or threads wherein the collar assembly and/or the handle or connector are threaded to operably be connected to one another.

24. The method of claim 22, wherein the collar assembly is attached to the connector or handle and secured via one of: glue or pressure fittings, or a PVC plastic coupler, or rings or a pressure fitting, or a washer from a group consisting of: wood washers, metal washers, and plastic washers.

25. The method of claim 22, wherein the connector or handle is placed in a holding device, wherein the holding device is able to accept the connector or handle with the apparatus having diameters of three-eighths of an inch in diameter to one and one-half inches in diameter.

26. The method of claim 22, wherein the fishing tackle includes at least one of: sinkers, split-shot sinkers, swivels, snaps, line connectors, small hooks, smaller fishing jigs, fishing flies, beads, spacers, clips, nail clipper, and floats.

27. The method of claim 22, wherein the at least one tube or vial is a small tube selected from the group consisting of: metal/aluminum tubes, plastic tubes, glass tubes, cigar tubes, vinyl tubes, rubber tubes, silicone tubes, carbide tubes, and wood tubes.

28. The method of claim 22, wherein the connector or handle is gripped and carried for the purposes of storage and access of the fishing tackle, and the apparatus is then placed in a desired receptacle including at least one of: fishing rod holders, plastic PVC pipe, metal pipe, wood pipe, or sand of a beach.

* * * * *